June 16, 1925.
A L. STEVENS
1,542,484
AIRCRAFT HOUSING DEVICE
Filed Jan. 25, 1924
4 Sheets-Sheet 1
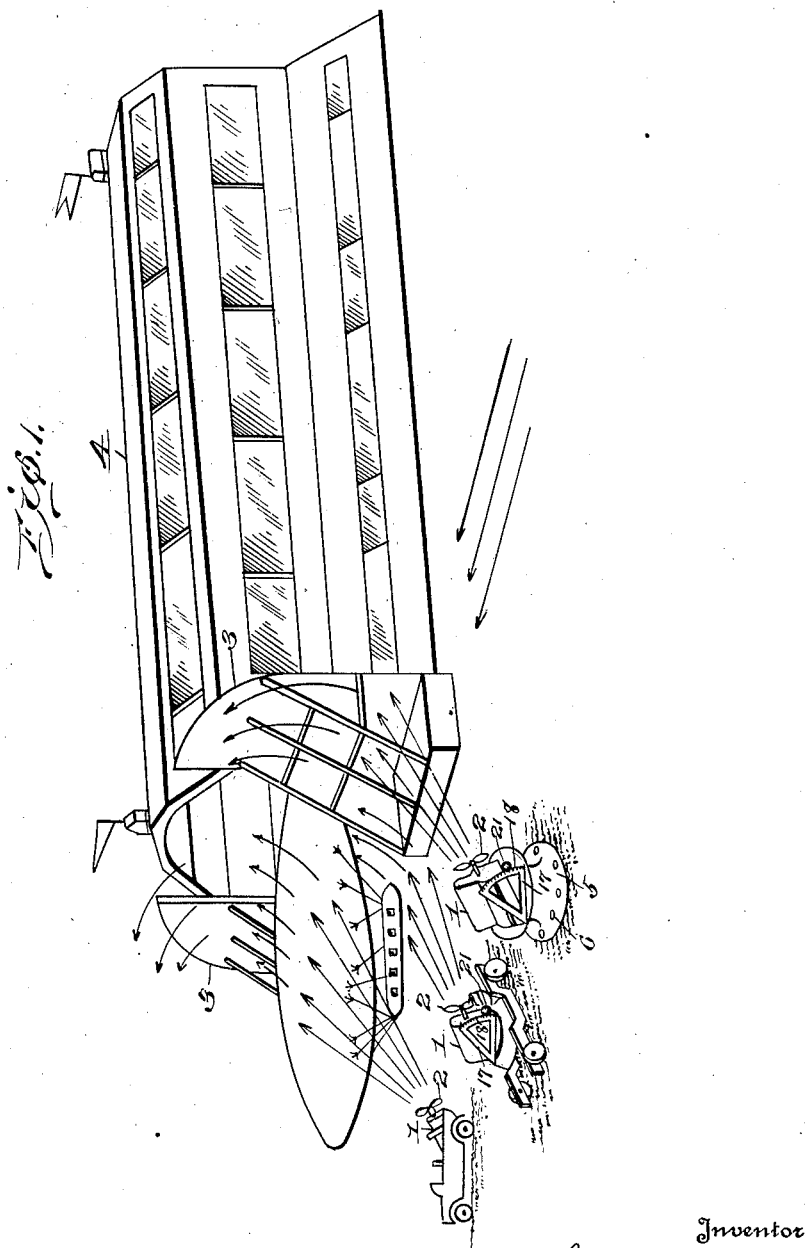

June 16, 1925.  
A L. STEVENS  
AIRCRAFT HOUSING DEVICE  
Filed Jan. 25. 1924
1,542,484
4 Sheets-Sheet 2
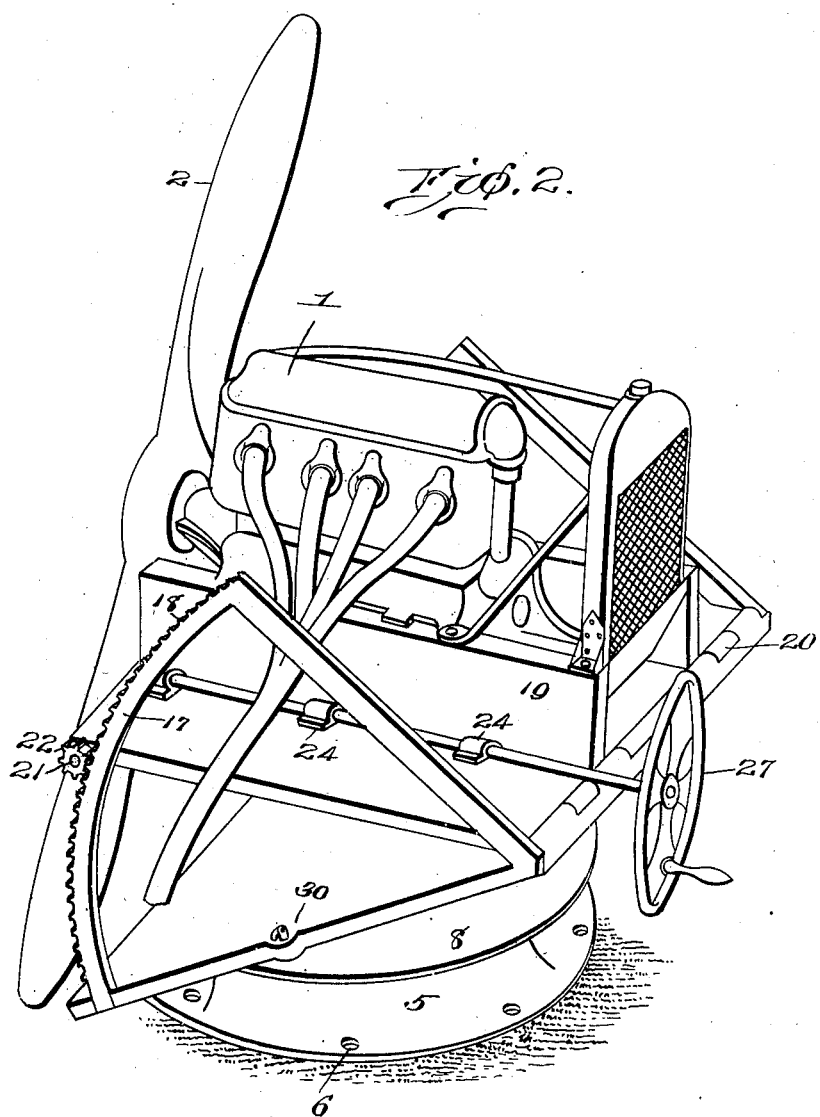

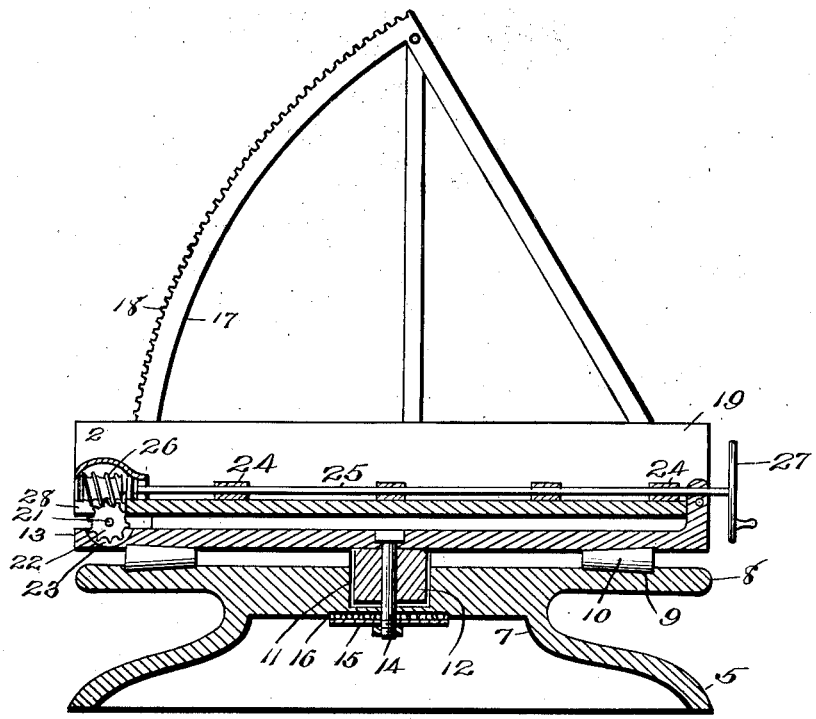

June 16, 1925.
A L. STEVENS
1,542,484
AIRCRAFT HOUSING DEVICE
Filed Jan. 25, 1924
4 Sheets-Sheet 4
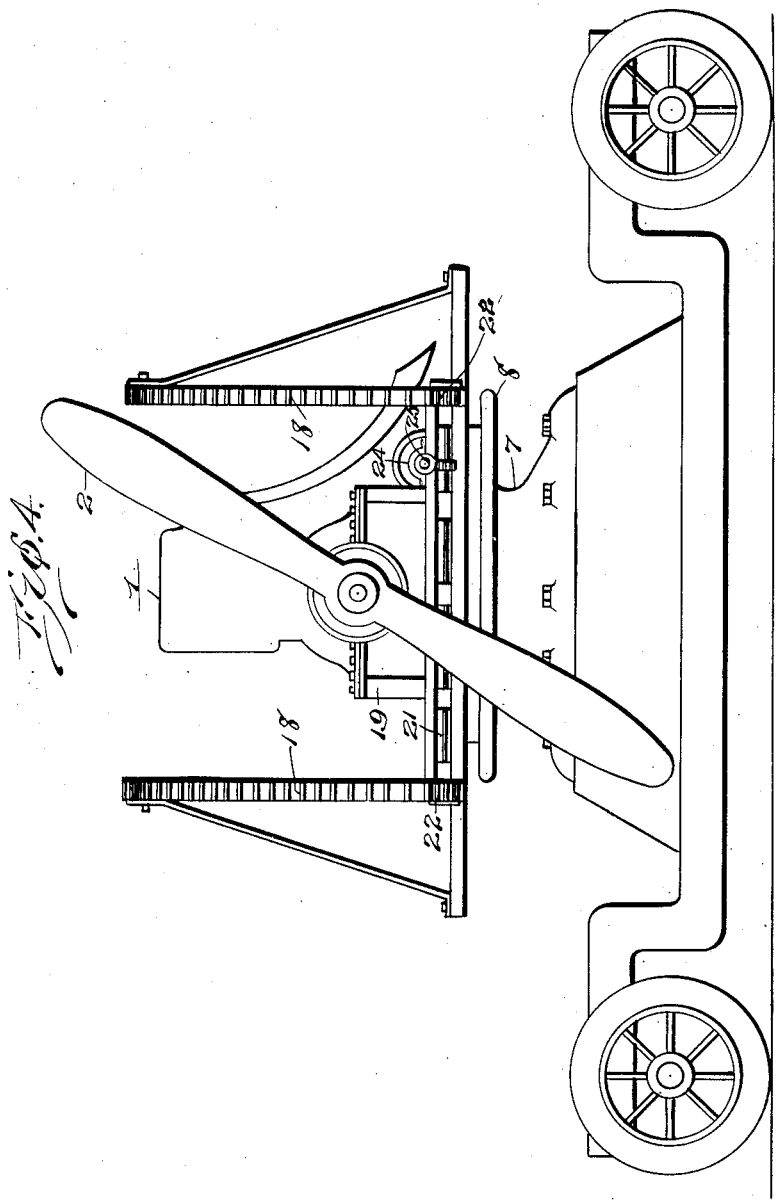

Patented June 16, 1925.

1,542,484

UNITED STATES PATENT OFFICE.

A. LEO STEVENS, OF BELLEVILLE, ILLINOIS.

AIRCRAFT-HOUSING DEVICE.

Application filed January 25, 1924. Serial No. 688,461.

*To all whom it may concern:*

Be it known that I, A. LEO STEVENS, a citizen of the United States, residing at Belleville, in the county of St. Clair and State of Illinois, have invented certain new and useful Improvements in Aircraft-Housing Devices, of which the following is a specification.

This invention relates in general to means for housing aircraft and more particularly to means mobile or adjustable adjacent the door of an aircraft hangar for controlling the effect of wind upon an aircraft entering or leaving a hangar.

One of the most serious problems in handling aircraft of the lighter than air type, is the problem of successfully handling such air craft while it is entering or leaving its hangar. The number of disasters caused by the effect of crosswinds on such craft while entering or leaving their hangars is well known. Others have sought to meet this problem by mounting the hangar or at least a portion of the same on a turntable so that it will always be possible to lead the craft into or out of the hangar directly up or down wind.

It is the object of my invention to provide a method of and means for successfully housing such craft irrespective of the direction of the wind.

It is a further object of my invention to provide a method of and means for greatly assisting in the handling of such craft upon the landing of the same and until it is housed.

Other objects of my invention will appear in the accompanying specification and claims and will be found in the accompanying drawings in which—

Figure 1 is a perspective view of my device in operation.

Figure 2 is a perspective view of my device.

Figure 3 is a side elevation partly in section of my mounting means.

Figure 4 is a front elevation of my device mounted on a mobile base.

Referring in greater particularity to the drawings it will be seen that the apparatus which I devised for overcoming the effect of adverse winds on aircraft consists in means for providing a current of air to counterbalance or nullify the effect of such winds on the craft.

Referring first to Figure 1, it will be seen that I propose to station one or more engines 1 provided with suitable air fans or propellers 2 at suitable locations just without the doors 3 of a hangar 4.

Referring more particularly to Figures 2 and 3 it will be seen that I have provided a mounting base 5 adapted to be secured to either a mobile or stationary base by means of any suitable retaining means inserted through apertures 6. The mounting base 5 has a centrally upstanding portion 7 terminating in a bearing plate 8 provided with a suitable race 9 for roller bearings 10. Centrally of this plate there is a recess 11 adapted to rotatably receive the hub 12 of the turntable 13, the turntable 13 being fixed against motion relative vertically with respect to said base plate by a suitable bolt 14 and plate 15, the plate 15 having a ball bearing engagement with a race 16 on the under side of said base plate.

Fixedly secured to the turntable is a substantially triangular yoke frame 17. One of the sides of each of the triangular arms of the frame 17 is of arcuate configuration and is provided with suitable gear teeth 18. The motor bed 19 is pivoted at one end at 20 to the turntable and has mounted in its other end, on suitable bearings, a shaft 21 fixedly secured to a pinion 22 the teeth of which are adapted to mesh with teeth 18 of the frame 17. A recess 23 is provided in the turntable for the reception of pinion 22 when the turntable is in horizontal position.

Fixedly secured to the motor bed 19 are bearings 24 provided for mounting a worm shaft 25 terminating at an end in a worm gear 26 and at the other in a hand wheel 27. The worm gear is adapted to actuate pinion 22 through a recess 28 in the base of the bed. A suitable cover casing 29 is provided for the worm gear to prevent ingress of dust and dirt.

Suitable lock means 30 is provided to lock the turntable in any desired position with relation to the base.

The engine 1 is secured by any suitable means to the motor bed 19, and is provided with air fans or propellers, preferably of the pusher type.

It will be readily seen that any required number of these devices can be provided at the points necessary just without the hangar. To provide for changing winds it is desirable to have one or more of these elements mounted on mobile bases such as are shown in Figures 1 and 4. When it is desired to use my principle in landing such craft it may be necessary to mount any device on motor driven trucks as shown in Figure 1.

From the foregoing my device will be seen to operate as follows: Upon ascertaining the direction of the adverse wind the stationary and mobile elements described will be first placed in the most advantageous positions. The motor beds will then be rotated on their bases until the proper direction of operation of the air fans is reached. The turntables will then be locked in this position. By the operation of the hand wheels the axis of rotation of the propellers will then be elevated to the desired angle, the angle depending largely upon the type and size of craft and somewhat upon the direction of the wind. The engines are then started and are operated at a speed sufficient to create a back flow of air sufficient to nullify the effect of the adverse wind upon the air craft.

If it is desired to use this same principle in the landing of aircraft one or more of my devices can be mounted on trucks such as is shown in Figure 1 and moved to any desired portion of the landing field where, by creating this upwind flow of air they can greatly assist in the landing of the craft and in the handling of the same while it is being moved to its hangar.

Obviously, if it is desired to land such an aircraft over water my device can be mounted in motor boats and the like without departing from the spirit of this invention.

I claim:

1. Means for assisting in the housing of aircraft under adverse wind conditions, said means comprising means for inducing a flow of air upwind of said adverse wind flow, and means for adjusting said second named means around a vertical axis.

2. Means for assisting in the housing of aircraft under adverse wind conditions, said means comprising means for inducing a flow of air upwind of said adverse wind flow, and means for adjusting said second named means around a horizontal axis.

3. Means for assisting in the housing of aircraft under adverse wind conditions, said means comprising means for inducing a flow of air upwind of said adverse wind flow, and means for adjusting said second named means around horizontal and vertical axes.

4. In combination, in means for assisting in housing aircraft under adverse wind conditions, power means, a propeller operated by said power means, said power means being adjustable around a horizontal axis.

5. In combination, in means for assisting in housing aircraft under adverse wind conditions, power means, a propeller operated by said power means, said power means being adjustable around horizontal and vertical axes.

6. Means for assisting in landing and housing aircraft under adverse wind conditions, said means including portable means for inducing a flow of air upwind of said adverse wind stream to nullify the effect of such adverse winds upon said aircraft.

7. In combination, in a means for assisting in landing and housing of aircraft under adverse wind conditions, portable means for inducing a flow of air upwind of said adverse wind stream carrying power means and a propeller operated by said power means, and means for adjusting said power means to vary the direction of flow of the airstream created by the rotation of said propeller.

8. Means for assisting in landing and housing of aircraft under adverse wind conditions, said means including portable means for inducing a flow of air upwind of said adverse wind flow, and means for adjusting said portable means to vary the direction of the induced flow of air.

In testimony whereof I affix my signature.

A. LEO STEVENS.